(No Model.)

D. W. BRUTON.
AXLE BOX FOR VEHICLE WHEELS.

No. 260,838. Patented July 11, 1882.

WITNESSES:

INVENTOR.
D. W. Bruton,
by C. A. Snow & Co.
ATTORNEYS.

UNITED STATES PATENT OFFICE.

DANIEL W. BRUTON, OF HARRISVILLE, NORTH CAROLINA.

AXLE-BOX FOR VEHICLE-WHEELS.

SPECIFICATION forming part of Letters Patent No. 260,838, dated July 11, 1882.

Application filed April 26, 1882. (No model.)

*To all whom it may concern:*

Be it known that I, DANIEL W. BRUTON, of Harrisville, in the county of Montgomery and State of North Carolina, have invented certain new and useful Improvements in Mounting Vehicle-Wheels; and I do hereby declare that the following is a full, clear, and exact description of the invention, which will enable others skilled in the art to which it appertains to make and use the same, reference being had to the accompanying drawings, which form a part of this specification.

Figure 1:
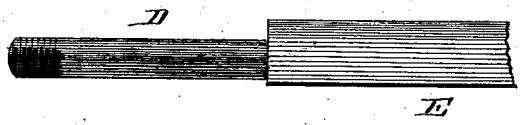
Figure 2:
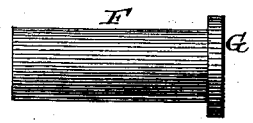
Figure 3:
Figure 4:
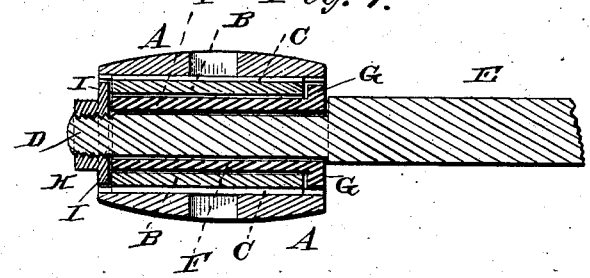

Figure 1 is a side view of the spindle. Fig. 2 is a side view of the loose or revolving axle-box. Fig. 3 is a side view of the nut, and Fig. 4 is a longitudinal sectional view of the device complete.

Corresponding parts in the several figures are denoted by like letters of reference.

My invention relates to vehicle-wheels; and it consists in the construction and arrangement of a loose and revolving axle-box fitted between the spindle and the usual fixed axle-box, as will be hereinafter more fully described.

In the drawings, A represents the hub of an ordinary vehicle-wheel. B is the axle-box, which is fitted in the same in the usual manner, and held securely by its feathers C. D is the spindle, and E the axle.

F is a loose or revolving axle-box, the interior diameter of which is equal to the exterior diameter of the spindle, while its exterior diameter is equal to the interior diameter of the fixed axle-box B. The spindle is fitted in said box F and the latter in the box B, where it may revolve freely. The loose box F has at its inner end a flange, G, abutting against the inner end of the fixed axle-box B.

H is the nut, which is screwed upon the end of the spindle, and is provided with a flange, I, abutting against the outer ends of the axle-boxes B and F, thus preventing sand and gritty substances from entering the bearings. The flanges G I prevent sand and dirt from entering between the boxes B F or between the inner box and the spindle. The loose box F, which is capable of revolving, greatly reduces the friction of the spindle.

My invention is applicable to vehicle and car wheels of all kinds; also to the wheels of machinery where it is desirable to reduce friction to a minimum in a simple and convenient manner.

I am aware that an axle-box arranged to revolve upon the spindle and within the axle-box proper secured in the hub is not new, and such I do not claim.

Having thus described my invention, I claim and desire to secure by Letters Patent of the United States—

The combination and arrangement, as described, of the spindle, the inner flanged axle-box revolving upon the latter, and an axle-box secured within the hub and mounted upon the said inner axle-box, between the flange of the latter and a flanged nut, as herein shown and specified.

In testimony that I claim the foregoing as my own I have hereto affixed my signature in presence of two witnesses.

DANIEL WESLEY BRUTON.

Witnesses:
P. H. MORRIS,
J. T. WADE.